United States Patent
Tseng et al.

(10) Patent No.: US 8,983,205 B2
(45) Date of Patent: Mar. 17, 2015

(54) METHOD FOR AUTO-DEPICTING TRENDS IN OBJECT CONTOURS

(71) Applicants: IEI Integration Corp., New Taipei (TW); Armorlink SH Corp., Shang-Hai (CN)

(72) Inventors: Chun-Shun Tseng, Keelung (TW); Jung-Hua Wang, Keelung (TW); Shan-Chun Tsai, Keelung (TW); Chiao-Wei Lin, Keelung (TW); Chang-Te Lin, Keelung (TW); Yi-Hua Wang, Keelung (TW)

(73) Assignees: IEI Integration Corp., Xizhi Dist., New Taipei (TW); Armorlink SH Corp., Min-Sing-Sin-Jhuang Industrial District, Shang-Hai (CN)

( * ) Notice: Subject to any disclaimer, the term of this patent is extended or adjusted under 35 U.S.C. 154(b) by 0 days.

(21) Appl. No.: 13/974,078

(22) Filed: Aug. 23, 2013

(65) Prior Publication Data
US 2014/0233846 A1   Aug. 21, 2014

(30) Foreign Application Priority Data
Feb. 18, 2013   (CN) .......................... 2013 1 0052212

(51) Int. Cl.
*G06K 9/48*   (2006.01)
*G06K 9/46*   (2006.01)
*G06T 7/00*   (2006.01)
*G06T 7/20*   (2006.01)

(52) U.S. Cl.
CPC ............. *G06T 7/0085* (2013.01); *G06T 7/2033* (2013.01)
USPC .......................................... 382/199; 382/201

(58) Field of Classification Search
None
See application file for complete search history.

(56) References Cited

U.S. PATENT DOCUMENTS 5,930,391 A * 7/1999 Kinjo ........................... 382/173

* cited by examiner

*Primary Examiner* — Daniel Mariam
(74) *Attorney, Agent, or Firm* — Winston Hsu; Scott Margo

(57) ABSTRACT

Disclosed herein is a method for auto-depicting trends in object contours (referred to as ADTOC). At the heart of ADTOC is a sifting process to determine a significant angular value via evaluating a plurality of angular values in a predefined range. ADTOC is characterized in that a probe-ahead concept is applied to obtain a reference angular value along the current route, and then the probed angular value is used to modify the significant angular value in order to timely correct the subsequent trace direction, thus achieving more accurate trace result. Contours with discontinuous segments caused by noise, obstacles, illumination, shading variations, etc. can also be auto-depicted without requiring a predefined auxiliary route.

21 Claims, 6 Drawing Sheets

METHOD FOR AUTO-DEPICTING TRENDS IN OBJECT CONTOURS

BACKGROUND OF THE INVENTION

1. Field of the Invention

The present invention relates to a method of image processing technology, and more particularly, to a method for auto-depicting (tracking) trends in object contours.

2. Description of the Prior Art

The method for depicting trends in object contours is considered to be a very important image processing technique. The reason is due to that more complete is the object contours depicted, more accurate the characteristics of the object, such as size, shape, or number, are recorded. These records may make the subsequent image processing be performed more easily and faster. The subsequent image processing refers to technologies that utilize the results of the edge detection for extended treatment such as scene analysis and pattern recognition. Regarding the technologies in practical applications, if we want to use less hardware resource or computing power to achieve better image processing performance, the edge detection results of the input image will inevitably need to have a higher usability. However, in a case where many image processing processes do not use the results obtained by depicting trends in object contours, but only use edge detection results as the input of the subsequent image processing, the results of the subsequent image processing is likely to be worse than expected. Since the existing edge detection methods usually retain only the discontinuous or representative edge segments, the correspondent relationship between these edge segments is not retained. For example, it is not informed that two segments belong to a discontinuous edge of the same object contour while performing the edge detection. As a result, the complete object contour can not be created. Thus, to identify the continuity of a plurality of edge segments under the condition that edge segments are discontinuous and then generate a possible object contour in accordance with the continuity established based on the edge segments, the present invention therefore proposes a method for depicting trends in object contours.

The conventional method for depicting trends in object contours is as follows: first, selecting a start point from an input image, where the start point is any pixel corresponding to the edge; detecting surrounding edge pixels of the start point and taking a pixel with a coordinate closest to the start point and not on the same edge where the start point is located; taking an edge containing the closest edge point as the object contour that must be depicted. However, the conventional method of selecting the closest edge for depicting trends in object contours has certain shortcomings. For example, when the background of the input image is complex, there is noise interference, and/or there is changing light and shadow, this could easily lead to the case of deviation or error of the depicted trends in object edge/contour. As shown in FIG. 7, if the conventional method which selects the closest edge is applied to scattered edges, the edge in the gray rectangle is taken as the object contour needed to be depicted. In other words, the conventional method which selects the closest edge is not robust enough, and is prone to be affected by the small difference of the input image (e.g., the light source) to therefore make the depicting result not properly fit the trends in object contours and even take the edges which belong to different contours to be the same trend in the object contour.

Related prior patents, such as Japanese Patent Publication No. 2001-319239, propose a method for tracking human contours. The method first supposes that a target pixel is located at the edge and there is an interval in front of the target pixel to act as the intensity range for retrieving the edge. When the edge intensity value within the interval is higher than a predetermined threshold, then the coordinate of the maximum edge intensity value within the interval is regarded as the coordinate of the next target pixel. However, the method for tracking contours of a character only uses the edge intensity value as the basis for determining the coordinate position of the next target pixel. When the background of the input image is more complex (e.g., the background includes woods, bushes, etc.) or the noise interference is severe, the coordinate position of the next target pixel is prone to be wrong.

In view of this, the present invention pays attention to drawbacks of the prior art design, and therefore proposes a method for auto-depicting trends in object contours to effectively overcome the above-mentioned issues.

SUMMARY OF THE INVENTION

The main objective of the present invention is to propose a method for auto-depicting trends in object contours, which first selects a first significant angular value based on a first region (tracking region) containing a start point, and taking the first significant angular value to be the possible trend of the contour. Then, a second region (probe region) is set at a certain distance from the start point along the edge/contour, the second region is used for staying one step ahead of probing edge angular values, a second significant angular value is determined by using a step of statistical screening based on the edge angular values, and the second significant angular value is taken as the basis for estimating the actual trends of the contours of the first region. It should be noted that the step of statistical screening to select the significant angular value may include at least one of following operations: (1) deriving a statistical value from the highest bin in $H_R$ (the histogram of the edge angular values in the tracking or probe region), (2) taking the average, or (3) taking the median. Therefore, the main technical idea of the statistical screening step is to utilize the angle/direction information as the basis for depicting trends in object contours. Hence, methods or tools (not limited to the methods mentioned above) capable of obtaining the required angle/direction information are all feasible for the step of statistical screening. The region, on the other hand, is a two-dimensional plane space containing a certain area. The following shows several common structures: a circular, an ellipse, a triangle, a square, a sector, a trapezoid, a polygon, and so forth, or even a line segment may be included in this structure category. Alternatively, the area may be a three-dimensional space with a certain volume, such as: a cylinder, a cone, and so forth.

The detailed steps of the method for auto-depicting trends in object contours are listed below.
 (a) receiving an input image;
 (b) extracting a plurality of coordinates and a plurality of angular values of image edges;
 (c) selecting a start point from the coordinates of the image edges;
 (d) defining a region of the input image as a first region, wherein the first region comprises the start point;
 (e) based upon a plurality of angular values corresponding to the first region to obtain a main angular value, determining a first angular value screening range based on the main angular value, and then performing angular value screening upon the first region based on the first angular value screening range to obtain a first significant angular value and a first index;

(f) determining a probe point on the input image in accordance with the first significant angular value obtained in the step (e), defining a second region comprising the probe point, determining a second angular value screening range in accordance with the first significant angular value, and then performing angular value screening upon the second region in accordance with the second angular value screening range to obtain a second significant angular value and a second index, wherein the second angular value screening range is greater than the first angular value screening range;

(g) utilizing the second significant angular value to update the first angular value screening range, and performing angular value screening to update the first significant angular value;

(h) determining a new start point in accordance with the first significant angular value obtained in the step (g), and replacing the start point of the step (d) with the new start point; and (i) repeating the step (d) to (h) until the first index or the second index is lower than a threshold.

The present invention detects and depicts the proper trends in the object with discontinuous or broken contours through the above mentioned steps, wherein the input image of the step (a) is generally referred to as the information inputted in a vector form, including optical and non-optical images, where the optical image may be, for example, the roadway, the barcode, the object contour of a broken object, and so forth; and the non-optical image may be obtained via the following manners: the Magnetic Resonance Imaging (MRI), the ultrasound, the computed tomography (CT), and so forth.

Another objective of the present invention is to provide a computer/machine readable medium for storing the computer-executable/machine-executable program, wherein the program is utilized for performing the proposed method of the present invention. This computer/machine readable storage medium may be the well-known hard disk, memory, and so forth.

A further objective of the present invention is to provide an electronic machine, including an apparatus for reading images, the computer/machine readable storage medium (which is another objective of the present invention), and a computing apparatus.

The present invention has three key technical ideas. One key technical idea is to take advantage of a second region for staying a step ahead of detecting the trend of the contour in a first region and retrieving the angular values within the second region, and take the second significant angular value as the reference angular value, wherein the second significant angular value is obtained by performing angular value screening upon the edge angular values extracted from the second region. Next, the reference angular value is regarded as the basis for updating the first significant angular value. The overall concept of the co-operation between the two regions is like the military march, wherein the second region (probe region) is like a scout in the army and is responsible for staying a step ahead of collecting information and returning to the rear of the army for the commander to determine whether to correct the moving direction of the military. A benefit of utilizing a probe region to detect and return the information in advance is to improve the reliability of the method for depicting trends in object contours of the present invention. If the second region were not employed for retrieving the angular values in advance to update the first significant angular value, the edge angular values contained in the first region would not be able to accurately depict the curvature of the edge in the case that an edge is curved seriously. At this situation, there is an error between the first significant angular value (which is selected through the angular value screening) and the actual trend of the edge; if the error is not corrected immediately, it will be accumulated and become larger and larger, leading to an inaccurate depicted contour. Like the aforementioned example of the military march, if there were no scout for detecting in advance, the enemy's whereabouts would not be known instantly. To put it another way, it is hard to make adjustments for tactics to deal with the movement of the enemy, and it is also hard to know the accurate position as well. The proposed method of the present invention utilizes angular values rather than edge intensity values adopted in the prior art design (e.g., Japanese Patent Publication No. 2001-319239). If the information for determining the edge/contour trends is based on the edge intensity values, the edge/contour trends may depart from the main edge direction due to coordinate contained in a messy edge point with a larger edge intensity value. Even if the messy edges are distributed within the region, the present invention still can perform angular value screening upon a plurality of edge angular values inside the region for finding out the main edge/contour trend (as indicated by the asterisk in FIG. 7). In other words, the proposed method of the present invention is able to find out the edge/contour trends consistent with the human perception.

Another key technical idea of the present invention is to set two angular value screening ranges, where the second angular value screening range is larger than the first angular value screening range. The main function of the angular value screening range is to filter out a portion of the noise interference and the angular values of the edges which are not the main edges, wherein the main edges are representative of the edges which are desired to be depicted. The reason why the second angular value screening range is set to be larger than the first angular value screening range is based on the consideration that the second angular value screening range is utilized for detecting and retrieving the reference angular values of the likely orientation. Excessively narrowing the angular value screening range will miss a lot of edge angular values, thus losing information of the likely orientation. On the other hand, the reason of setting the first angular value screening range by a smaller value is that since the reference angular values of the likely orientation are obtained, narrowing down the range may help to select an angular value from it fast and accurately. In other words, taking the aforementioned army march for example, if we have knew the enemy is located approximately at six to eight o'clock positions, then the military should adjust its march direction mainly towards six to eight o'clock positions according to the information in conjunction with the actual situation, rather than marching blindly (a larger angular value screening range).

Yet another key technical idea of the present invention is to describe the equations in the steps with a vector space. Therefore, it is more convenient for the proposed method to have dimension expansion. The proposed method is not restricted to the two-dimensional plane. Taking the coordinate of the start point as an example, it is expressed as $(ix_1, ix_2)$ in the two-dimensional space, and expressed as $(ix_1, ix_2, ix_3)$ in the three-dimensional space. The possible scenarios of the two regions in the two-dimensional space and three-dimensional space are simulated and shown in the figures. In a case where the input image is the two-dimensional plane image, as shown in FIG. 4, the reference numeral 42 indicates the edge/contour line, and the reference numerals 40 and 41 are representative of the second region and the first region, respectively. In another case where the input image is a three-dimensional image, as shown in FIG. 3, the reference numeral 32 indicates the edge/contour line, and reference numerals 30 and 31 are representative of the second region and the first region, respectively. The above examples demonstrate the feasibility of the present invention in the dimension expansion, and the present invention is not limited to the examples mentioned in both the two-dimensional space and the three-dimensional space.

These and other objectives of the present invention will no doubt become obvious to those of ordinary skill in the art after reading the following detailed description of the preferred embodiment that is illustrated in the various figures and drawings.

DETAILED DESCRIPTION

A methodology for auto-depicting trends in object contours of an input image is proposed in the present invention.

Figure 6:
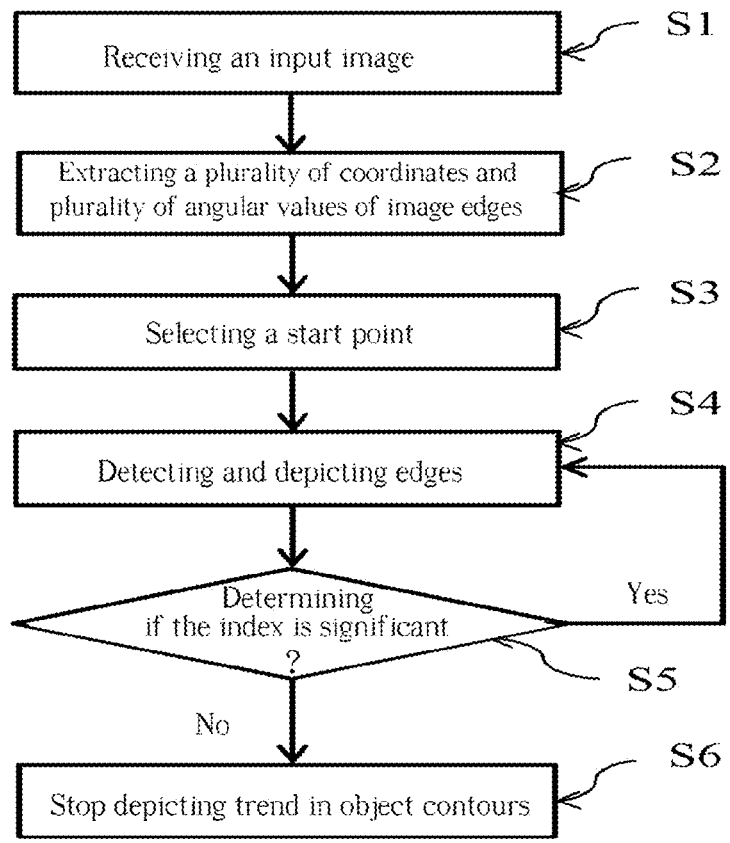
FIG. 6 is a flowchart illustrating the method of the present invention.
Figure 7:
FIG. 7 is a diagram showing results obtained through utilizing the method for depicting trends in messy edges.

FIG. 6 is a flowchart illustrating the method for auto-depicting trends in object contours according to an embodiment of the present invention.

Embodiment 1

Figure 1A:
FIG. 1A is a diagram illustrating an image containing a roadway.
Figure 1B:
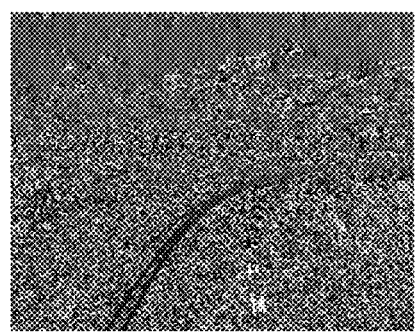
FIG. 1B is a distribution diagram of angular values obtained through performing edge detection upon the input image shown in FIG. 1A.
Figure 1C:
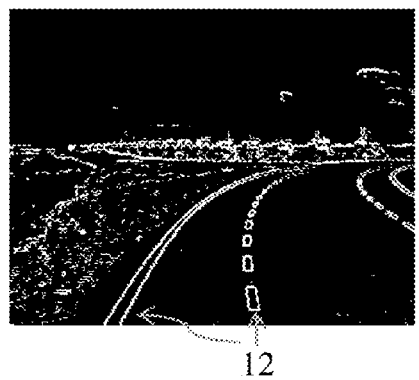
FIG. 1C is a diagram showing the result of the edge detection performed upon the input image shown in FIG. 1A.

FIG. 1A is an input image containing a roadway. First, if the input image is a color image, the color image will be converted to a grayscale image. The conversion of the color image to grayscale is performed by using software such as Adobe Photo Shop, Ulead Photo Impact, etc. FIG. 1B and FIG. 1C are an angular value distribution diagram (angular values are indicated by different grayscale values) and an edge detection result (white points indicate the edges) respectively obtained from FIG. 1A through the step S2. The step S2 is to retrieve and extract coordinates and angular values of the image edges by an edge detection method, where the edge detection method may be referred to as a method capable of obtaining gradient information. For example, the edge detection method may employ a conventional edge detection algorithm such as Sobel, Prewitt, Roberts, etc.

Sobel algorithm is taken as an example of the edge detection method, and the equations for calculating a plurality of angular values θ and a plurality of edge intensity values G are as follows.

$$SB = \begin{bmatrix} 1 & 2 & 1 \\ 0 & 0 & 0 \\ -1 & -2 & -1 \end{bmatrix}, \quad \text{equation 1}$$

$$G_h = SB * I, \quad \text{equation 2}$$
$$G_v = SB^T * I,$$

$$G(x_1, x_2) = \sqrt{(G_h(x_1, x_2))^2 + (G_v(x_1, x_2))^2} \quad \text{equation 3}$$

$$\theta(x_1, x_2) = \arctan(G_h(x_1, x_2)/G_v(x_1, x_2)) \quad \text{equation 4}$$

The edge detection result (FIG. 1C) is obtained by comparing a threshold with the edge intensity values G, wherein the threshold may be a user-defined constant value or a variable value changed according to the input image. Here, the threshold is set as a constant value obtained by multiplying the average value of all of the edge intensity values G within the input image by a number (e.g., 3 or 4). As shown in FIG. 1C, the coordinates of the edge points (i.e., the white points shown in FIG. 1C) retained after the edge detection are regarded as elements within an S set.

After obtaining the S set from step S2, step S3 is executed to select a start point from the S set. In step S3, a start point $(ix_1, ix_2)$ is first selected using one of the following manners: (1) obtaining the edge intensity value G of each pixel point after the edge detection process, sorting the edge intensity values G, and then sequentially selecting one from the sorted edge intensity values G, from the strongest to the weakest, to be the start point, wherein the same start point should not be selected repeatedly; (2) selecting any non-repeated coordinate randomly to act as the start point, wherein the non-repeated coordinate is included in the S set; (3) selecting any coordinate manually by the user from the input image to act as the start point. The manner of selecting the start point manually is employed by this embodiment to serve as an example for illustrative purposes.

In step S4, the start point $(ix_1, ix_2)$ is utilized to be a circle center for plotting a circular region with a radius r, and then the circular region is defined as a first region (the tracking circle). Next, $\theta_c$ is defined as the angular values corresponding to coordinates of the S set within the first region. Hence, a main angular value id is obtained by performing histogram $H_R$ upon $\theta_c$ and taking the main angular value of the highest bin, and then a first angular value screening range is determined according to the main angular value id. The equation id±$ra_1$ ($ra_1$ is a variable parameter, e.g., 10) is utilized for determining the first angular value screening range, and the first angular value screening range is utilized for performing angular value screening upon the first region to obtain a first significant angular value and a first index. It should be emphasized that, in order to illustrate the embodiment of the step S4 clearly, the circular region with a certain area is utilized as an example; however, it is not a limitation of the shape of the region of the present invention.

The angular value screening may be performed using one of the following methods: (1) taking the average; (2) taking the median; (3) deriving a statistical value from the highest bin in a histogram $H_R$. The detailed description of the above-mentioned angular value screening methods will be described as follows.

First, $D_s$ and $C_s$ are defined as sets containing $\theta$ values and coordinates $(x_1, x_2)$ satisfying equation 5, respectively.

$$(rs<\theta(x_1,x_2)<rb) \cap ((tx_1-x_1)^2+(tx_2-x_2)^2 \le r^2), \forall (x_1,x_2) \in S \quad \text{equation 5}$$

rs, rb: angular value screening range
$\theta$: angular value
$tx_1$, $tx_2$: circle center coordinates
r: radius of the circular region
$x_1$, $x_2$: coordinates of the edge point
S: coordinate set of the edge points In equation 5, rb=id+ra, rs=id−ra.

(1) Taking the average is to divide the sum of all the elements in $D_s$ by the total number of the elements in $D_s$.

Figure 8:
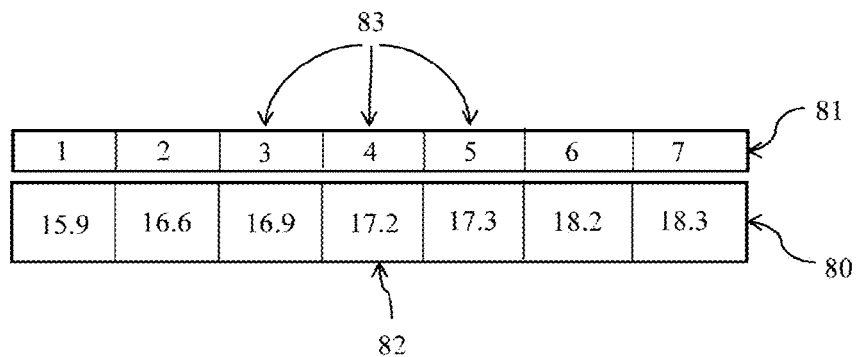
FIG. 8 is an example illustrating the method of taking the median.

(2) Taking the median has two different ways as follows. (i) Sort all of the elements in $D_s$, wherein if there is an odd number of elements included in $D_s$, then the angular value of the element which is located at the middle of the sorted elements is selected; on the other hand, if there is an even number of elements included in $D_s$, then the angular value of the former of two elements which are located at the middle of the sorted elements is selected. (ii) Set a position range in accordance with the position of the middle element obtained from (1). For instance, the corresponding elements are selected based on middle element's position ±d (d is a variable parameter), wherein the position range should be smaller than the total number of the elements in $D_s$. Next, the average of all the angular values corresponding to the selected elements is calculated. As shown in FIG. 8, each number in row 81 is representative of a position, and numbers in row 80 are representative of the sorted angular values, wherein the row 80 and the row 81 are mapped to each other, that is to say, each angular value in the row 80 corresponds to a position in the row 81. For instance, based on the position of the middle element 17.2 the angular values (i.e., 16.9, 17.2, 17.3) in the interval respectively corresponding to positions 3, 4, 5, will be selected, and the average of these angular values is 17.1. The angular value may be sorted from the smallest to the largest (i.e., sorted in an ascending order), or sorted from the largest to the smallest (i.e., sorted in a descending order).

(3) Deriving a statistical value from the highest bin in histogram $H_R$ is to select the quantized interval containing the largest number of elements, and output the angular value obtained by taking the average of the angular values corresponding to all the elements in the selected quantized interval, as shown in the following equations 6 to 8.

$$q = \frac{\max(D_s) - \min(D_s)}{Bn} \quad \text{equation 6}$$

In equation 6, q is the width of the quantized interval and changes in accordance with $D_s$, wherein the maximum and the minimum of $D_s$ also change in accordance with equation 5, and Bn denotes the user specified maximum number of bins in the histogram. Bn is set to 10 in all embodiments presented in this document.

$D_s$ set can be separated into Bn sets (or bins in terms of histogram) by equation 7, where $(x_1, x_2) \in C_s$. Denote N(j) as the $j_{th}$ bin, j=1, 2, . . . , Bn. Next, the number of elements included in the set N(j) is defined to be n(j). The one in the bins N which has the largest number of elements is defined as N(i); on the other hand, the one in the bins N which has the least number of elements is defined as N(k). A first significant angular value $sa_1$ can be obtained by the following equation 8.

$$\min(D_s) + q \times (j-1) \le \theta(x_1, x_2) < \min(D_s) + q \times j, \quad \text{equation 7}$$
$$j = 1, 2, \ldots, Bn$$

$$sa_m = \frac{\sum N(i)}{n(i)}, \quad \text{equation 8}$$
$$m = 1, 2$$

$sa_1$: the first significant angular value
$sa_2$: the second significant angular value After obtaining the first significant angular value $sa_1$, the step S5 is executed subsequently to determine whether a first index is lower than a threshold (which may be a user-defined constant value). The calculation of the first index may be performed by using one of the following manners: (1) performing histogram $H_R$ upon the angular values and dividing the difference of the number n(i) of the highest mode and the number n(k) of the lowest mode by the number n(i) of the highest mode (equation 9); (2) performing histogram $H_R$ upon the angular values and dividing the number n(i) of the highest mode by the total number of elements contained in the set $D_s$ (equation 10).

$$p\_r = \frac{(n(i) - n(k))}{n(i)} \quad \text{equation 9}$$

$$p\_r = \frac{n(i)}{|D_s|} \quad \text{equation 10}$$

$|D_s|$: the number of elements contained in the set $D_s$

When the set $D_s$ includes the angular values corresponding to the edge coordinates within the first region, $sa_1$ obtained via angular value screening is the first significant angular value. When the set $D_s$ includes the angular values corresponding to the edge coordinates within the second region, $sa_2$ obtained via angular value screening is the second significant angular value.

$$tx_1 = ix_1 + \cos(id) \times md \quad \text{equation 11}$$

$$tx_2 = ix_2 + \sin(id) \times md \quad \text{equation 12}$$

md: predetermined parameter

After the first significant angular value $sa_1$ is calculated by utilizing equations 5 to 8, a probe point $(tx_1, tx_2)$ can be calculated according to equations 11 and 12 by replacing id with $sa_1$, thereby utilizing the probe point as a center to plot a circular region (the probe circle) as a second region with a radius r. A second angular value screening range $sa_1 \pm ra_2$ ($ra_2$ should be greater than $ra_1$) can be determined in accordance with the first significant angular value $sa_1$, and a second significant angular value $sa_2$ within the second region can be calculated by utilizing equations 5 to 8. After $sa_2$ is obtained, a second index can be calculated by utilizing equations 9 or 10, and it is subsequently determined whether the second index is lower than the threshold by executing the step S5, wherein the threshold may be a user-defined constant value.

Figure 1D:
FIG. 1D is a diagram showing the result obtained through depicting trends of edges in the input image shown in FIG. 1A.

The first angular value screening range is updated to $sa_2 \pm ra_1$ by using the second significant angular value $sa_2$, and angular value screening is performed upon the first region by using the updated first angular value screening range to obtain an updated first significant angular value $sa_1$. To put it another way, the start point and $sa_2$ are used as the center of the circle and the reference angular value respectively, and then the first significant angular value $sa_1$ is recalculated by using equations 5 to 8 for producing an updated $sa_1$. id of equation 11 and equation 12 is replaced with the updated $sa_1$ to obtain coordinate of an updated circle center $(tx_1, tx_2)$. Steps S4 to S5 are repeated for producing a next new start point after utilizing the updated circle center $(tx_1, tx_2)$ as a new start point $(ix_1, ix_2)$, or the procedure of auto-depicting trends in object contours is terminated when the stopping criteria is met, wherein the stopping criteria is met when one of the first index and the second index is lower than the threshold (e.g., 0.6, 0.3). The results of auto-depicting trends in object contours are indicated by the black asterisks shown in FIG. 1D.

Embodiment 2

Figure 2A:
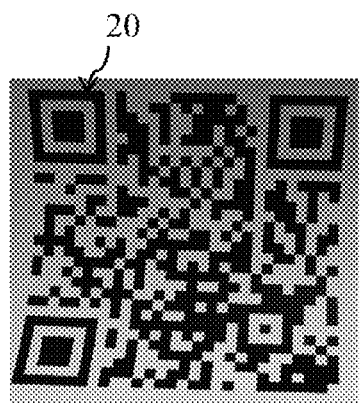
FIG. 2A is a diagram illustrating an image containing a QR code.
Figure 2B:
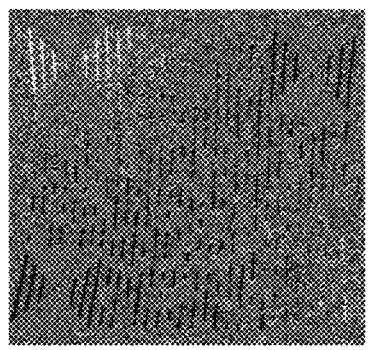
FIG. 2B is a distribution diagram of angular values obtained through performing edge detection upon the input image shown in FIG. 2A.
Figure 2C:
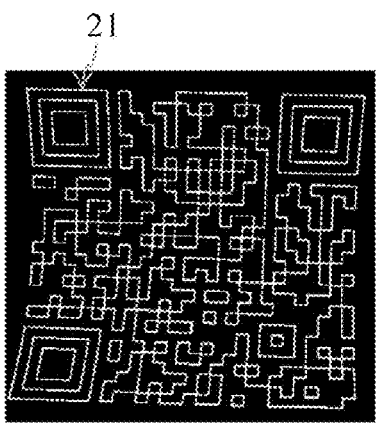
FIG. 2C is a diagram showing the result of the edge detection performed upon the input image shown in FIG. 2A.

FIG. 2A is an input image containing a QR code. First, if the input image is a color image, the color image will be converted to a grayscale image. The conversion of the color image to grayscale is performed by using software such as Photo Shop, Photo Impact, etc. FIG. 2B and FIG. 2C are an angular value distribution diagram (angular values are indicated by different grayscale values) and an edge detection result (white points indicate the edges) respectively obtained from FIG. 2A through the step S2. The step S2 is to retrieve and extract coordinates and angular values of the image edges by utilizing an edge detection method, where the edge detection method may be referred to as a method capable of obtaining gradient information. For example, the edge detection method may employ a conventional edge detection algorithm such as Sobel, Prewitt, Roberts, etc.

Sobel algorithm is taken as an example of the edge detection method, and a plurality of angular values θ and a plurality of edge intensity values G can be obtained by using equations 1 to equation 4.

The edge detection result (FIG. 2C) is obtained by comparing a threshold with the edge intensity values G, wherein the threshold may be a user-defined constant value or a variable value changed according to the input image. Here, the threshold is set as a constant value obtained by multiplying the average value of all of the edge intensity values G within the input image by a number (e.g., 7 or 8). As shown in FIG. 2C, the coordinates of the edge points retained after the edge detection (i.e., white points shown in FIG. 2C) are regarded as elements within an S set.

Figure 2D:
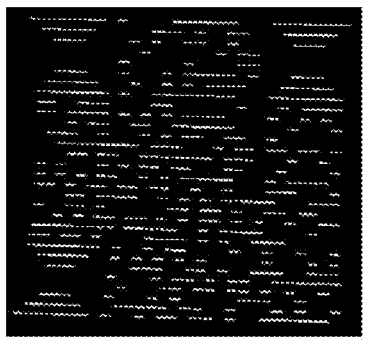
FIG. 2D is a diagram showing an edge detection result in the first direction of the input image shown in FIG. 2A.
Figure 2E:
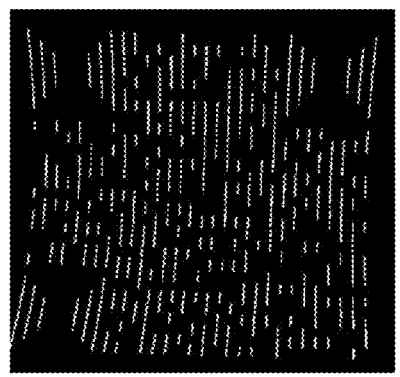
FIG. 2E is a diagram showing an edge detection result in the second direction of the input image shown in FIG. 2A.
Figure 2F:
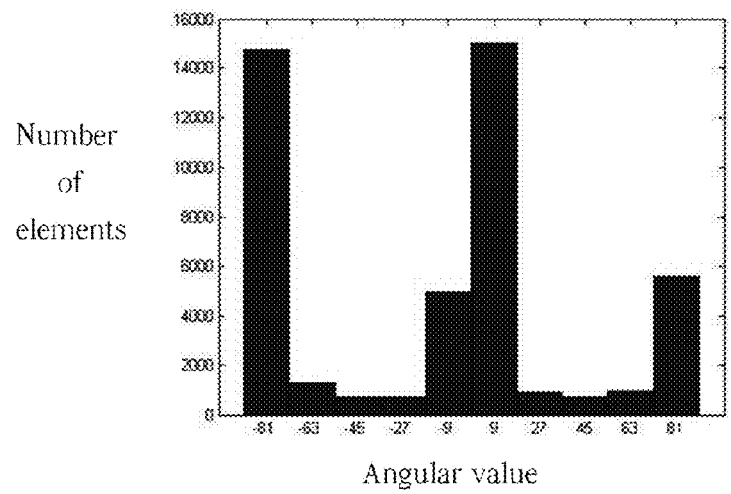
FIG. 2F is a diagram showing the histogram $H_A$ of the angular values corresponding to elements of an S set.
Figure 2G:
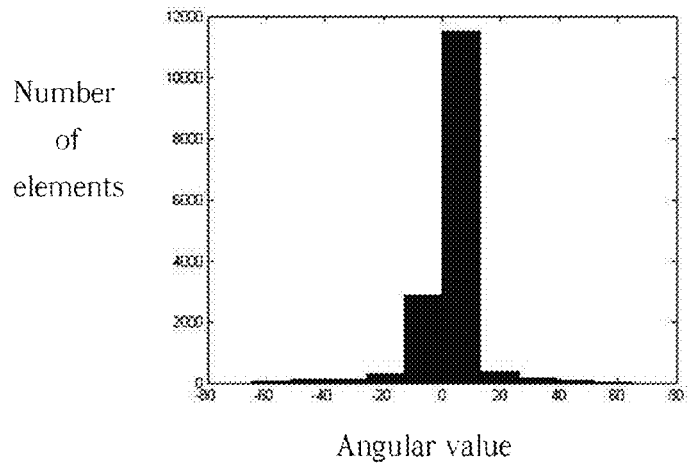
FIG. 2G is the histogram $H_A$ of the angular value in the first direction obtained through performing the edge detection upon the input image shown in FIG. 2A.
Figure 2H:
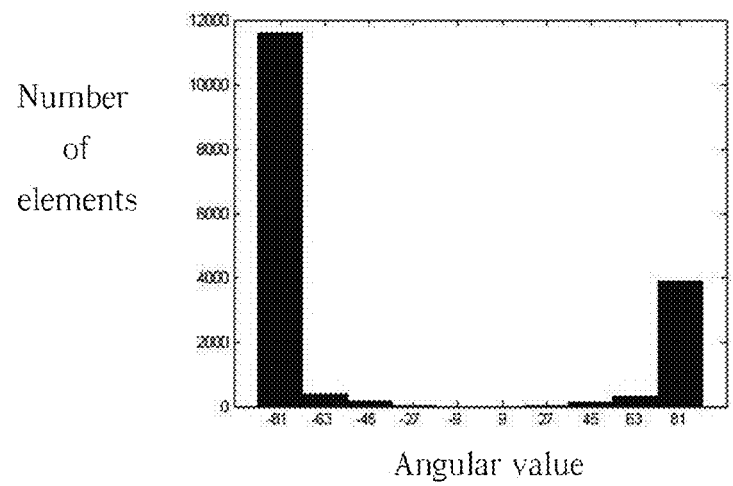
FIG. 2H is the histogram $H_A$ of the angular value in the second direction obtained through performing the edge detection upon the input image shown in FIG. 2A.

Since QR code contains bars and spaces possessing a bi-directional characteristic, the angular values obtained through Sobel algorithm tend to populate at two certain angular values. To utilize this property, the histogram $H_A$ of the angular values associated with the elements within the S set is calculated, as shown in FIG. 2F, and the largest (or the highest) bin is defined as a first direction $Ang\_Dir^{1st}$. Then, the $Ang\_Dir^{1st}$ is utilized as a center (or reference) to set an angular value range (i.e., $Ang\_Dir^{1st}\text{-}d\_a \sim Ang\_Dir^{1st}\text{+}d\_a$, where $d\_a$ is a variable parameter). The angular value range is a range used for obtaining the distribution (histogram) of the angular values, as shown in FIG. 2G. Furthermore, with regard to determining a second angular value direction, angular values included in the selected angular value range are deleted. The histogram $H_A$ is utilized for obtaining the distribution (histogram) of the remaining angular values, and the largest bin is defined as the second angular value direction, as shown in FIG. 2H. It should be noted that the first angular value direction is not limited to the exemplary direction of the present embodiment. $G_h$ and $G_v$ can be obtained through Sobel algorithm (equation 2), as shown in FIG. 2D and FIG. 2E. The edge coordinates contained in $G_h$ are regarded as elements within coordinate set $S_1$, and the edge coordinates contained in $G_v$ are regarded as elements within coordinate set $S_2$. Next, S set is redefined to be the elements contained in $S_1$.

After obtaining the S set from the step S2, the step S3 is executed to select a start point from the S set. In the step S3, a start point $(ix_1, ix_2)$ is first selected using one of the following manners: (1) obtaining the edge intensity value G of each pixel point after the edge detection process, sorting the edge intensity values G, and then sequentially selecting one from the sorted edge intensity values G, from the strongest to the weakest, to be the start point, wherein the same start point should not be selected repeatedly; (2) selecting any non-repeated coordinates randomly as the start point, wherein the non-repeated coordinate is included in the S set; (3) selecting any coordinate manually by the user from the input image to act as the start point.

In step S4, the start point $(ix_1, ix_2)$ is utilized to be a circle center for plotting a circular region with a radius r, and then the circular region is defined as a first region (the tracking circle). Next, id is defined as the first angular value direction $Ang\_Dir^{1st}$, and then a first angular value screening range is determined according to id. The equation $id \pm ra_1$ ($ra_1$ is a variable parameter, e.g., 10) is utilized for determining the first angular value screening range, and the first angular value screening range is utilized for performing angular value screening upon the first region to obtain a first significant angular value and a first index. It should be emphasized that, in order to illustrate the embodiment of the step S4 clearly, the circular region with a certain area is utilized as an example; however, it is not a limitation of the shape of the region of the present invention.

The angular value screening method may be performed using one of the following methods: (1) taking the average; (2) taking the median; (3) deriving a statistical value from the highest bin in histogram $H_R$. The detailed descriptions of the above mentioned angular value screening methods will be described as follows.

First, $D_s$ and $C_s$ are defined as sets containing θ values and coordinates $(x_1, x_2)$ satisfying equation 5, respectively. In equation 5, rb=id+ra, rs=id−ra.

(1) Taking the average is to divide the sum of all the elements in $D_s$ by the total number of the elements in $D_s$.

(2) Taking the median has two different ways as follows. (i) Sort all of the elements in $D_s$, wherein if there is an odd number of elements included in $D_s$, then the angular value of the element which is located at the middle of the sorted elements is selected; on the other hand, if there is an even number of elements included in $D_s$, then the angular value of the former one of two elements which are located at the middle of the sorted elements is selected. (ii) Set a position range in accordance with the position of the middle element obtained from (1). For instance, the corresponding elements are selected based on middle element's position ±d (d is a variable parameter), wherein the position range should be smaller than the total number of the elements in $D_s$. Next, the average of the sum of all the angular values corresponding to the selected elements is calculated. As shown in FIG. 8, each number in row 81 is representative of a position, and numbers in row 80 are representative of the sorted angular values, wherein the row 80 and the row 81 are mapped to each other, that is to say, each angular value in the row 80 corresponds to a position in the row 81. For instance, based on the position of the middle element 17.2 the angular values (i.e., 16.9, 17.2, 17.3) in the interval respectively corresponding to positions 3, 4, 5, will be selected, and the average of these angular values is 17.1. The angular value may be sorted from the smallest to the largest (i.e., sorted in an ascending order), or sorted from the largest to the smallest (i.e., sorted in a descending order).

(3) Deriving a statistical value from the highest bin is to select the quantized interval containing the largest number of elements, and output the angular value obtained by taking the average of the angular values corresponding to all the elements in the selected quantized interval, as shown in the aforementioned equations 6 to 8.

In equation 6, q is the width of the quantized interval and changes in accordance with $D_s$, wherein the maximum and the minimum of $D_s$ also change in accordance with equation 5, and Bn denotes the user specified maximum number of bins in the histogram.

$D_s$ set can be separated into Bn sets (or bins in terms of histogram) by equation 7, where $(x_1, x_2) \epsilon C_s$. Denote N(j) as the $j_{th}$ bin, j=1, 2, . . . , Bn. Next, the number of elements included in the element set N(j) is defined as n(j). The one in the set N which has the largest number of elements is defined as N(i); on the other hand, the one in the element set N(j) which has the least number of elements is defined as N(k). A first significant angular value $sa_1$ can be obtained by the aforementioned equation 8.

After obtaining the first significant angular value $sa_1$, the step S5 is executed subsequently to determine whether a first index p_r is lower than a threshold (which may be a user-defined constant value). The calculation of the first index p_r may be performed using one of the following manners: (1) obtaining histogram $H_R$ of the angular values and dividing the difference of the number n(i) of the highest mode and the number n(k) of the lowest mode by the number n(i) of the highest bin (equation 9); (2) obtaining histogram $H_R$ of the angular values and dividing the number n(i) of the highest bin by the total number of elements contained in the set $D_s$ (equation 10).

When the set $D_s$ includes the angular values corresponding to the edge coordinates within the first region, $sa_1$ obtained via angular value screening is the first significant angular value. When the set $D_s$ includes the angular values corresponding to the edge coordinates within the second region, $sa_2$ obtained via angular value screening is the second significant angular value.

After the first significant angular value $sa_1$ is calculated by utilizing equations 5 to 8, a probe point $(tx_1, tx_2)$ can be calculated according to equations 11 and 12 by replacing id with $sa_1$ thereby utilizing the probe point as a center to plot a circular region as a second region with a radius r. A second angular value screening range $sa_1 \pm ra_2$ ($ra_2$ should be larger than $ra_1$) can be determined in accordance with the first significant angular value $sa_1$, and a second significant angular value $sa_2$ within the second region can be calculated by utilizing equations 5 to 8. After $sa_2$ is obtained, it is determined whether a second index is lower than the threshold by executing the step S5 subsequently, and the second index can be calculated by utilizing equations 9 or 10, wherein the threshold may be a user-defined constant value.

The first angular value screening range is updated to $sa_2 \pm ra_1$ by using the second significant angular value $sa_2$, and angular value screening is performed upon the first region by using the updated first angular value screening range to obtain an updated first significant angular value $sa_1$. To put it another way, the start point and $sa_2$ are used as the center of the circle and the reference angular value respectively, and then the first significant angular value $sa_1$ is recalculated by using equations 5 to 8 for producing an updated $sa_1$. id of equation 11 and equation 12 is replaced with the updated $sa_1$ to obtain coordinate of an updated circle center $(tx_1, tx_2)$. Steps S4 to S5 are repeated for producing a next new start point after obtaining a new start point (i.e., a corrected coordinate of the circle center), or the procedure of auto-depicting trends in object contours is terminated when the stopping criteria, wherein the stopping criteria is met when one of the first index and the second index is lower than the threshold (e.g., 0.6, 0.3).

Figure 2I:
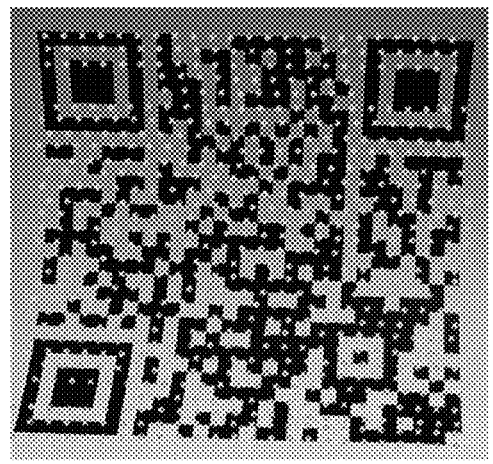
FIG. 2I is a diagram showing the first angular value direction result obtained according to the method for depicting trends in object contours of the input image shown in FIG. 2A.
Figure 2J:
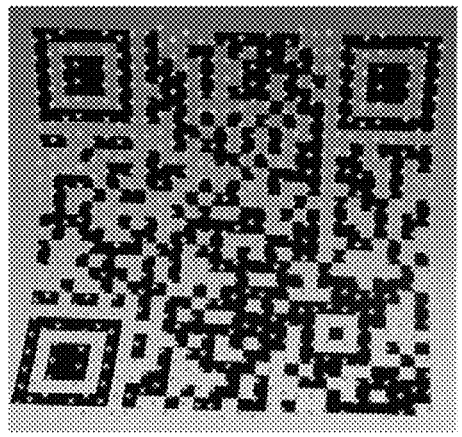
FIG. 2J is a diagram showing the second angular value direction result obtained according to the method for depicting trends in object contours of the input image shown in FIG. 2A.
Figure 3:
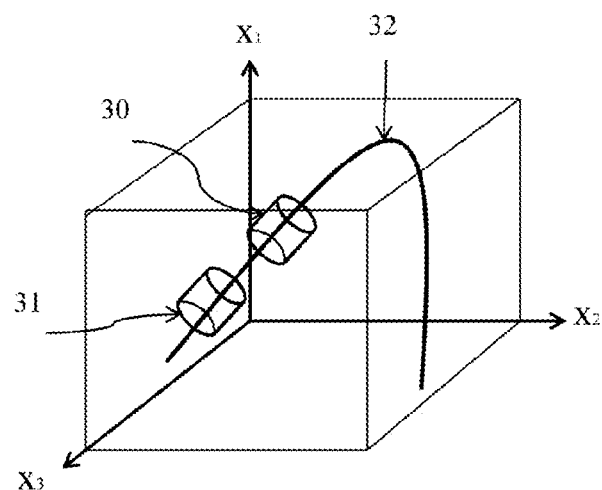
FIG. 3 is a diagram illustrating relationships between two regions of the three-dimensional (3D) space.
Figure 4:
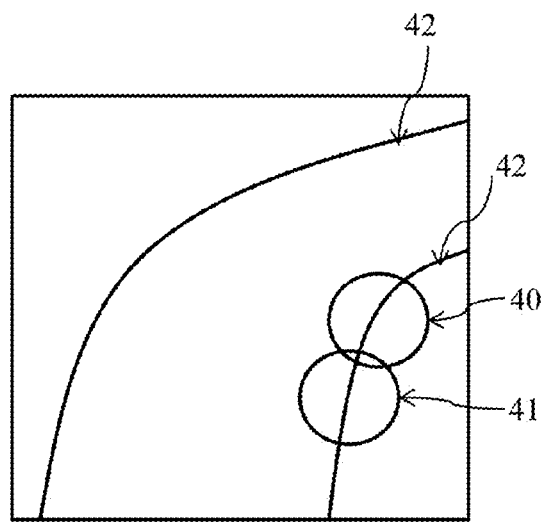
FIG. 4 is a diagram illustrating relationships between two regions of the two-dimensional (2D) space.
Figure 5:
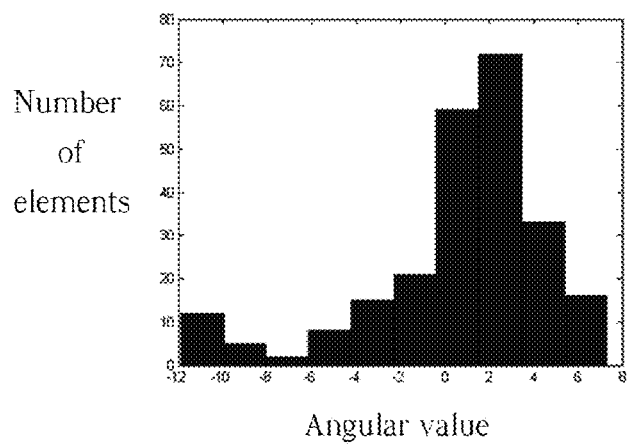
FIG. 5 is a diagram illustrating the distribution of the angular values of the region.

After auto-depicting trends in object contours for the S set corresponding to the $S_1$ set is complete, as shown in FIG. 2I, $S_2$ will be defined to be elements of S set, and the process of auto-depicting trends in object contours is the same as that employed for processing the aforementioned S set. The only difference is that, while executing the step S4, the second angular value direction needs to be defined to be id. The result of auto-depicting trends in object contours for the S set corresponding to the $S_2$ set is shown in FIG. 2J.

The above descriptions are only preferred embodiments of the present invention, but not limitations of the present invention. Designs based on the above alternatives and other further extensions complying with the features and spirits of the present invention all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for auto-depicting trends in object contours, comprising:
 (a) receiving an input image;
 (b) extracting a plurality of coordinates and a plurality of angular values of image edges from the input image;
 (c) selecting a start point from the coordinates of the image edges;
 (d) defining a region of the input image as a first region, wherein the first region comprises the start point;
 (e) based upon a plurality of angular values corresponding to the first region to obtain a main angular value, determining a first angular value screening range based on the main angular value, and performing angular value screening upon the first region based on the first angular value screening range to obtain a first significant angular value and a first index;
 (f) determining a probe point on the input image in accordance with the first significant angular value obtained in step (e), defining a second region comprising the probe point, determining a second angular value screening range in accordance with the first significant angular value, and performing angular value screening upon the second region in accordance with the second angular value screening range to obtain a second significant angular value and a second index, wherein the second angular value screening range is greater than the first angular value screening range;

(g) utilizing the second significant angular value to update the first angular value screening range, and performing angular value screening upon the first region to update the first significant angular value;

(h) determining a new start point in accordance with the first significant angular value obtained in step (g), and replacing the start point of step (d) with the new start point; and (i) repeating steps (d) to (h) until the first index or the second index is lower than a threshold;

wherein the method is performed using a computer or processor.

2. The method of claim 1, wherein the input image is a two-dimensional image.

3. The method of claim 1, wherein the input image is a three-dimensional image.

4. The method of claim 1, wherein the input image is a grayscale image.

5. The method of claim 1, wherein the input image is a color image.

6. The method of claim 5, wherein before performing step (b), the method further comprises converting the color image to a grayscale image.

7. The method of claim 1, wherein an edge detection algorithm is utilized to extract the coordinates and the angular values of the image edges.

8. The method of claim 7, wherein the edge detection algorithm is one of the following algorithms: Sobel, Prewitt, and Roberts.

9. The method of claim 1, wherein the step of selecting the start point comprises one of following manners: (1) selecting a coordinate from sorted edge intensity values; (2) selecting a coordinate randomly; and (3) selecting a coordinate manually.

10. The method of claim 1, wherein the first region and the second region are two-dimensional geometric structures each having a certain area.

11. The method of claim 1, wherein the first region and the second region are three-dimensional geometric structures each having a certain volume.

12. The method of claim 1, wherein the step of obtaining the main angular value comprises:

deriving a statistical value from the highest bin in histogram $H_R$ of the first region.

13. The method of claim 1, wherein the angular value screening is performed by using one of following manners: (1) deriving a statistical value from a highest bin in histogram $H_R$; (2) taking a median.

14. The method of claim 13, wherein the median is obtained through sorting elements which meet a predetermined criteria and taking a middle element as a significant angular value; and the predetermined criteria comprises: (1) a coordinate corresponding to an angular value is contained in a region; and (2) the angular value is contained in an angular value screening range.

15. The method of claim 13, wherein the median is obtained through sorting elements which meet a predetermined criteria, establishing a range centered at middle of the sorted elements, obtaining a plurality of angular values contained in the position range, and taking an average of a sum of the obtained angular values; and the predetermined criteria comprises: (1) a coordinate corresponding to an angular value is contained in a region; and (2) the angular value is contained in an angular value screening range.

16. The method of claim 15, wherein the range is no greater than the number of the sorted elements.

17. The method of claim 1, wherein each of the first index and the second index is obtained using one of following manners: (1) performing histogram $H_R$ upon angular values, taking a difference between the number of angular values in the highest bin and the number of angular values in the lowest bin, and obtaining a ratio by dividing the difference by the number of angular values in the highest bin; and (2) performing histogram $H_R$ upon angular values and obtaining a ratio by dividing the number of angular values in the highest bin by the number of the angular values in the histogram $H_R$.

18. The method of claim 1, wherein the probe point or the new start point is determined by converting the updated first significant angular value in (g).

19. The method of claim 1, wherein the threshold is a real number greater than 0 but not greater than 1.

20. A non-transitory computer readable medium, arranged for storing a computer executable program, wherein the computer executable program is utilized for performing the method of claim 1.

21. An electronic machine, comprising the computer readable medium of claim 20.

* * * * *